Nov. 24, 1953                        C. B. RICHEY                        2,660,322
                        IMPLEMENT ATTACHMENT FOR LOADER FRAMES
Filed March 9, 1951                                                 2 Sheets-Sheet 1
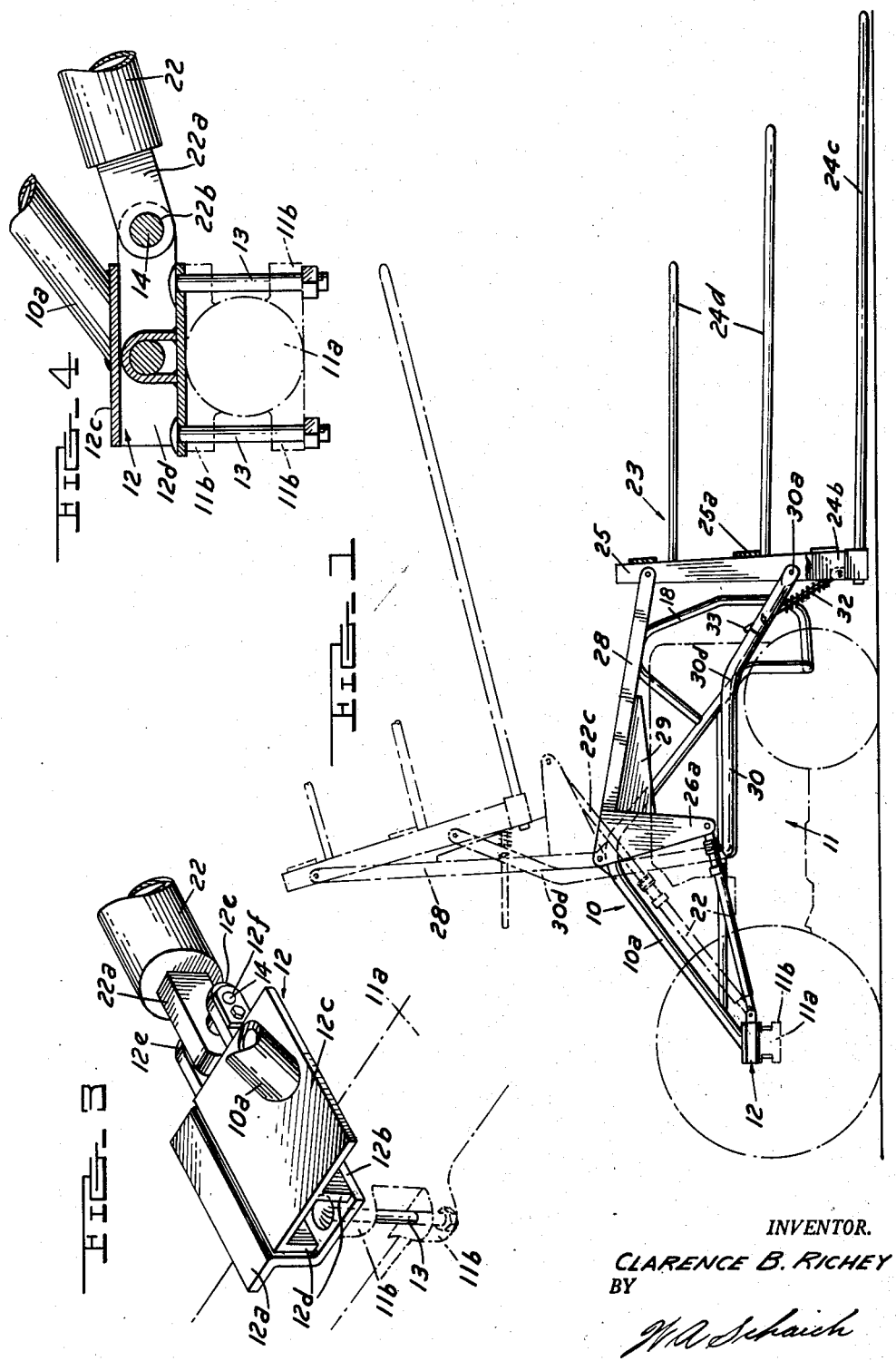
INVENTOR.
CLARENCE B. RICHEY
BY
*W. A. Schaich*
ATTORNEY

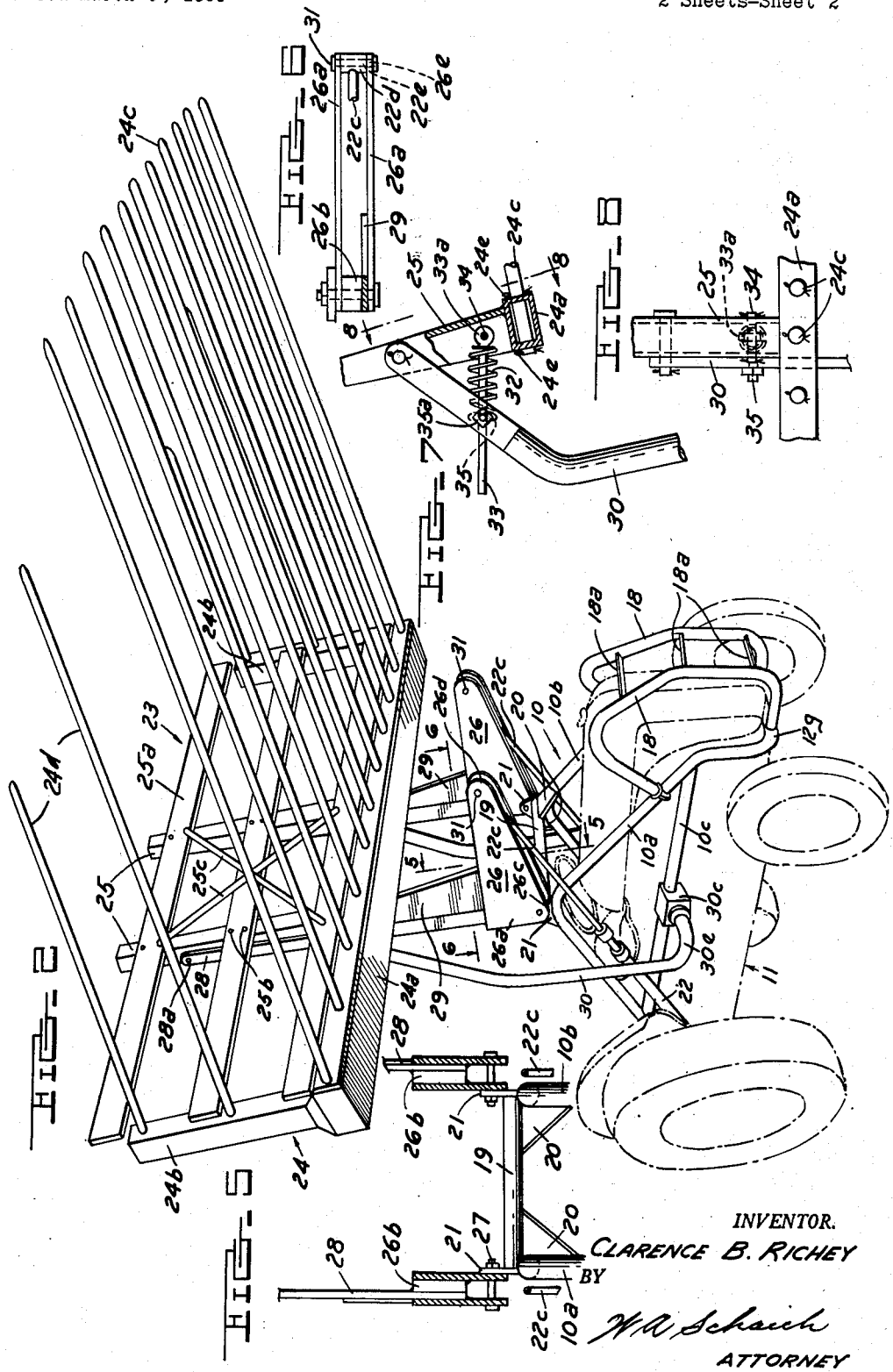

Patented Nov. 24, 1953

2,660,322

UNITED STATES PATENT OFFICE 2,660,322

IMPLEMENT ATTACHMENT FOR LOADER FRAMES

Clarence B. Richey, Royal Oak, Mich., assignor to Dearborn Motors Corporation, Birmingham, Mich., a corporation of Delaware Application March 9, 1951, Serial No. 214,714

7 Claims. (Cl. 214—131)

1

This invention relates to an improved material handling attachment for tractor mounted loaders.

Tractor mounted loaders have had wide acceptance by the modern farmer. While such tractor mounted loaders have been primarily used for loading manure and similar materials, buck rake attachments have been adapted for use with the tractor mounted loaders. The advantage of so mounting a buck rake is quite obvious in that the hay or other similar crop can be gathered in the field and directly transported to the storage point without any in between handling. A serious drawback, however, to the use of buck rake attachments on loader frames has been the unwieldiness and instability of the tractor when the loaded buck rake is carried in front of the tractor, and also the impaired visibility of the tractor operator resulting from so carrying such implement.

Likewise, prior buck rake attachments for tractors had no provision for absorbing road shocks or inertia forces during transport. Such forces have been absorbed by the loader frame with resulting failures in the welded joints and other members due to fatigue as a result of continual jouncing.

Accordingly, it is an object of this invention to provide an improved material handling attachment for tractor mounted loaders.

Another object of this invention is to provide an improved mounting for a material handling attachment for tractor mounted loaders which cushions inertia, road shocks and other forces exerted by the loaded implement attachment when carried in an elevated position above the tractor.

Another object of this invention is to provide an improved buck rake attachment for a tractor mounted loader frame.

A further object of this invention is to provide a buck rake attachment for a tractor mounted loader frame which may be elevated to an overhead position above the tractor so that the center of gravity of the load lies substantially within the tractor wheel base for optimum stability and to provide unobstructed visibility for the tractor operator in the elevated transporting position of the buck rake attachment.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Fig. 1 is a side elevational view of a loader frame mounted on a tractor showing a buck rake attachment of this invention mounted on such frame.

Fig. 2 is a perspective view of the buck rake attachment constructed in accordance with this invention shown in an elevated position on the tractor.

Fig. 3 is an enlarged perspective detail view showing the mounting bracket for attaching the rear end of a loader frame to the tractor rear axle.

Fig. 4 is an enlarged detail cross sectional view taken along the plane 4—4 of Fig. 1.

Fig. 5 is a cross-sectional view taken along the plane 5—5 of Fig. 2.

Fig. 6 is a cross-sectional view taken along the plane 6—6 of Fig. 2.

Fig. 7 is an enlarged detail view, shown partly in section, of the fork counter-balancing spring.

Fig. 8 is a detail front view of Fig. 7 encompassed generally by the plane 8—8.

As shown on the drawings:

In Fig. 1 there is shown a substantially conventional loader frame 10 mounted upon a tractor 11 of well-known make.

The loader frame 10 is of tubular construction having main side members 10a and 10b of generally A-shaped configuration. The rear ends of each side frame member 10a and 10b are respectively secured to a pair of brackets 12 mounted on the rear tractor axle housing 11a as best shown in Figs. 1 and 3. Brackets 12 comprise an offset plate portion 12a which has one horizontal portion 12b respectively secured to a pair of tractor fender lugs 11b by bolts 13. A horizontal plate 12c is secured in spaced relationship to the horizontal portion 12b of each offset plate 12a. A pair of upstanding spacer bars 12d welded respectively to plates 12c and 12a effect such spacing. Spacer bars 12d project forwardly beyond the edge of horizontal plate 12c and the extreme end portions thereof are rounded as shown at 12e. A transverse hole 12f is provided in the end of each of the spacer bars 12b to receive a transverse pin 14 for a purpose to be later described. The rear end portions of side frames 10a and 10b are then respectively welded to the top surface of plate portions 12c of bracket 12 as shown in Fig. 3.

The side frames 10a and 10b are connected at their lower front ends by a transverse tubing 12g which may be an integral continuation of the forward ends of side frame portions 10a and 10b. Transverse tube 12g has an upstanding centrally disposed lug (not shown) which is conveniently secured to a depending mounting plate secured to the front tractor axle 11c. Inasmuch as such mounting forms no part of this invention, further description thereof is not believed necessary. Reference may be had to U. S. Patent No. 2,489,629 to Ford for further details of such mounting.

A pair of generally C-shaped bumper guards 18, are respectively welded at their ends to the side frames 10a and 10b and to the transverse connecting tube 12g, as best shown in Fig. 2. Guards 18 are maintained in transversely spaced relationship by a plurality of horizontal connecting bars 18a respectively welded at their ends to the frames 10a and 10b. A transverse tubular member 19 is disposed between the vertexes of side frames 10a and 10b and has its ends respectively secured by welding to the top of such frames. A pair of gusset plates 20 provided on opposite sides of tubular member 19 are welded respectively thereto and to the side frame members for reinforcement as best shown in Fig. 5. An upstanding lug 21 is welded to each end of the transverse tube 19 as best shown in Fig. 5 and each of the lugs 21 is provided with a suitable transverse aperture for a purpose to later appear.

A pair of hydraulic cylinders 22 are respectively connected at their rear ends to the brackets 12. A rearwardly projecting integral lug 22a is provided on the rear end of each cylinder 22 and lugs 22a are transversely apertured as shown at 22b (Fig. 4) so that the transverse pin 14 supported by the forward ends of spacers 12d may be inserted through aperture 22b to respectively pivotally mount the rear end of cylinders 22 to the brackets 12. A piston rod 22c projects forwardly out of each cylinder 22 and the forward end of such piston rod is connected to the implement to be mounted on frame 10, as will be later described.

Hydraulic cylinders 22 are supplied pressured fluid by a front mounted pump (not shown) supported between the bumper guards 18 and connected to the front end of the tractor crank shaft (not shown) in a well-known manner. The hollow interior of the main frame 10 serves as a reservoir for the hydraulic fluid. As the loader frame 10 and the pump for providing pressured hydraulic fluid to the cylinders 22 are all conventional, further description thereof is not believed necessary.

A buck rake attachment indicated generally by the numeral 23 is provided for mounting on top of loader frame 10. Buck rake 23 comprises a vertically disposed generally U-shaped frame 24 having a horizontal bight or base portion 24a of rectangular tubular construction, as best shown in Fig. 7. At each end of bight portion 24a there is secured, as by welding, an upright arm 24b which is also preferably of rectangular tubular construction. A plurality of forwardly extending crop gathering tines 24c are secured along the bight portion 24a in spaced relationship, and a pair of similar tines 24d are suitably secured to each of the arms 24b. Tines 24c and 24d are of tubular construction and are respectively insertable in suitable aligned transverse apertures in the bight portion 24a and arms 24b. A pair of cotter pins 24e inserted in suitable apertures in each tine 24c and disposed adjacent opposite faces of the bight portion 24a prevent longitudinal displacement of tines 24c. Tines 24d are similarly secured to arms 24b.

A pair of vertically disposed channel-shaped posts 25 are welded to the top of bight portion 24a in transversely spaced relationship thereon and are disposed centrally of the bight portion 24a. A plurality of spaced laterally extending bars 25a are secured to posts 25 by bolts 25b as shown in Fig. 2. Bars 25a are preferably of wood and serve as a back-stop for a crop gathered by the buck rake as will be later described. A pair of diagonal braces 25c suitably secured to the top and lower bars 25a maintain such bars in a rectangular configuration. Buck rake 23 is pivotally mounted on loader frame 10 by a parallel linkage arrangement as will now be described.

A pair of arms 26 are respectively pivotally mounted on lugs 21. Each arm 26 comprises a pair of generally triangular shaped plates 26a spaced apart at their rear ends by a spacer block 26b. A bolt 27 inserted through aligned apertures provided adjacent apex 26c of arms 26a and through the apertured lug 21 pivotally mounts such arms to the lugs 21. A pair of rectangular bars 28 are respectively pivotally secured at their upper ends to the upper ends of post 25 by bolts 28a and to the rear ends of arms 26 by welding as best shown in Figs. 5 and 6. Gusset plates 29 welded respectively to arms 26 and to bars 28 are provided for strengthening bars 28. A pair of links 30 are respectively pivotally secured at their upper ends to the lower end portions of post 25 as by bolts 30a and to a medial portion of horizontal member 10c of the A-shaped side frames 10a and 10b by fittings 30c. Links 30 are laterally offset at approximately the center thereof as shown at 30d in Fig. 1 to permit the forward end of such links to clear the front wheels of the tractor when lowering buck rake 23 to the ground as shown in Fig. 1. The lower ends of links 30 are bent inwardly as shown at 30e in Fig. 2 to permit pivotal connection of such links to the horizontal frame member 10c.

The forward ends of piston rods 22c (Fig. 6) have a transversely disposed tubular bearing sleeve 22d welded thereon and such sleeves respectively fit between the lower vertex portion of plates 26a. Plates 26a have aligned apertures 26e which when respectively aligned with the bore of sleeves 22d permit bolts 31 to be inserted therethrough to pivotally secure piston rods 22c to such plates and hence to arms 26. Sleeves 22d space the plates 26a a sufficient distance apart so that the piston rods 22c can freely pass between the arms 26 as will be later described.

When buck rake 23 is elevated to the maximum height position shown in Fig. 2 by operation of cylinders 22, it is very desirable that the center of gravity of the loaded buck rake be positioned substantially over the center of gravity of the tractor to insure optimum stability and load distribution on the tractor wheels. In such position it is possible for the buck rake, especially when loaded, to swing rearwardly to an "over center" position which would make it virtually impossible to lower the buck rake to the unloading position. Accordingly, there is provided a pair of springs 32 respectively slidably mounted upon a pair of rods 33 pivoted to the posts 25. Rods 33 have an eye-shaped end 33a through which a bolt 34 may be inserted to respectively pivotally secure such ends to the upright post 25. The other end of rods 33 are respectively slidably insertable within an eye bolt 35 pivotally secured to links 30 by nuts 35a as best shown in Fig. 7, thus when the buck rake 23 pivots rearwardly, springs 32 will be compressed against eye bolt 35 to resist the rearwardly swinging movement of such buck rake to resiliently maintain the rake in the position shown in Fig. 1.

With the buck rake 23 positioned in the lowered position as shown in Fig. 1, a load of hay or other material is readily gathered by such rake by merely driving the tractor forwardly so that the tines 24c will be forced under the pile or window. The buck rake may then be lifted by actuating the hydraulic cylinders 22. This is accomplished by permitting pressured hydraulic fluid to flow into such cylinders by actuation of suitable valves (not shown) whereupon piston rods 22c will be extended. Arms 26 are thus pivoted in a counter-clockwise direction which thereby moves the two pairs of links 28 and 30 also in a counter-clockwise direction to raise buck rate 23. Since links 28 and 30 are arranged in a substantially parallelogram relationship, the buck rake 23 will be raised upwardly in substantially the same position. A slight rearward tilt of rake 23 is preferable and such is accomplished by the bias of springs 32, which also limit the rearward pivotal movement of buck rake 23 to prevent the lifting linkage from assuming an "over center" position. However, when rake 23 is elevated to its maximum height, links 28 and 30 are then in a substantially vertical position which provides columnar support for the load and permits unobstructed visibility from the tractor seat as the rake is thus elevated above the operator's line of vision. Also, the center of gravity of the load is disposed above the tractor wheel base in such location as to provide optimum tractor stability. When the buck rate is elevated to the position shown in Fig. 2, the load carried thereon can then be quickly and easily transported to the desired discharge point whereupon the pressured fluid is bled out of hydraulic cylinders 22 and the buck rake 23 is lowered to the ground by gravity. During transport the springs 32 function to cushion and absorb road shocks and inertia forces.

From the above description, it is clearly apparent that there is here provided an implement attachment whereby the loader frame may be utilized for mounting other implements thereon which readily increases the versatility of such frame and also reduces the expense to the farmer of maintaining or having on hand more than one frame to perform a wide variety of work. The savings to the farmer by utilizing such an attachment are quite obvious. Furthermore, the arrangement herein described is not only of sturdy construction but is relatively simple thereby resulting in economy of manufacture. Hence, such an attachment is readily available to the farmer for but a fraction of the cost of a complete new implement and mount for such implement. It will be noted too, that when the load carried by the rake is raised over the tractor, the center of gravity of such load lies substantially within the tractor wheel base, thus providing for unusual tractor stability. The visibility of the tractor operator is not the least impaired as an unobstructed view is available when the rake is in an elevated transporting position. It is also pointed out that the danger of an "over center" position of the elevated load is substantially eliminated by the use of this improved implement mounting.

It will, of course, be understood that various details of construction may be varied through a wide range without departing from the principles of this invention and it is, therefore, not the purpose to limit the patent granted hereon otherwise than necessitated by the scope of the appended claims.

I claim:

1. For use with a tractor having a loader frame mounted thereon, an implement mounting comprising in combination a pair of upper link members having their ends respectively pivoted to opposed top portions of the frame and to an implement, a pair of lower link members having their ends respectively pivoted to the frame below said upper links and to the implement in spaced relationship relative to said upper links, said upper and lower links being constructed and arranged in substantially parallel relationship when the implement is in its lowered position, lever means secured to a selected pair of said links, hydraulically operated means connected to said lever means and the loader frame for raising said links and simultaneously moving the links relative to one another toward an aligned position, and resilient stop means interposed between one pair of said links and the implement to prevent movement of the links to an "over center" position when the implement is in its raised position.

2. For use with a tractor having a loader frame mounted thereon, a sweep rake attachment for mounting said rake on the frame comprising, in combination, a pair of lever arms, each of said lever arms comprising a pair of spaced apart plate members, means for pivotally mounting said pair of arms at laterally spaced points on the upper portions of the frame, a pair of first link members having one of their ends respectively secured to said lever arms substantially at right angles thereto, the other ends of said first link members being pivoted to said rake, a pair of second link members having their ends respectively pivotally connected to the frame and said rake at spaced points from said first links thereby defining a substantially parallelogram linkage arrangement when said link members are in lowered position, a pair of hydraulic cylinders pivotally connected respectively to the ends of said lever arms and the loader frame, the outer ends of said hydraulic cylinders being respectively disposed intermediate said pair of plate members, means for actuating said cylinders to effect relative movement between said link members for raising said link members and said rake to an elevated position above the tractor at which elevated position said link members are substantially longitudinally aligned and said rake substantially overlies said upper portions of said frame and stop means preventing over-center movement of said link members when the same are in their substantially aligned position.

3. For use with a tractor having a loader frame mounted thereon, a sweep rake attachment for mounting said rake on the frame comprising in combination, a pair of lever arms, each of said lever arms comprising a pair of spaced apart plate members, means for pivotally mounting said pair of arms at laterally spaced points on the upper portions of the frame, a pair of first link members having one of their ends respectively secured to said lever arms substantially at right angles thereto, the other ends of said first link members being pivoted to said rake, a pair of second link members having their ends respectively pivotally connected to the frame and said rake at spaced points from said first links thereby defining a substantially parallelogram linkage arrangement, a pair of hydraulic cylinders pivotally connected respectively to the ends of said lever arms and the loader frame, the outer ends of said hydraulic cylinders being respectively disposed intermediate said pair of plate members, means for actuating said cylinders for raising said link members and said rake to an elevated position above the tractor at which the link members are substantially aligned, said rake being pivotally movable relative to said link members upon elevation thereof, and resilient means operating between relatively movable elements of said rake and said link members for limiting the pivoting movement of said rake relative to said link members when the rake is in said elevated position.

4. The combination defined in claim 3 wherein said last mentioned means comprises a pair of springs mounted respectively between said second link members and said rake, said springs being constructed and arranged to resist movement of said rake to an "over center" position.

5. A tractor mounted material handling device comprising a material container, a linkage including a pair of link elements pivoted to the container for raising and lowering of said container relative to the tractor, said elements being substantially parallel when said container is in its lower position and movable relative to said container until said links are substantially longitudinally aligned when said container is raised, means for actuating said element to raise and lower said container, a spring operatively interposed between said container and one of said link elements, said spring being stressed during movement of said container relative to said linkage upon raising the container to prevent "overcenter" movement of said elements as said container approaches a position of maximum elevation and said links assume their said substantially aligned positions.

6. For use with a tractor having a fixed frame mounted thereon, an implement mounting comprising a pair of pivot links having end portions respectively pivoted at vertically spaced points on said frame, a material handling device pivotally mounted at the other end portions of said pivot links, power means for actuating said links to elevate and lower said device by effective pivoting movement of said links about the spaced points on said frame, said links being substantially parallel when said device is in lowered position and being relatively movable to a substantially longitudinally aligned position when said device is in a raised position, and stop means including a stop element on one of said links for limiting movement of said one of said links when said device is in raised position to prevent "overcenter" movement of said links to and beyond a truly aligned position.

7. For use with a tractor having a fixed frame thereon, an implement mounting comprising means on the frame defining a pair of vertically spaced pivot points located within the tractor wheel-base, a link pivoted to each of said points, respectively, and extending therefrom longitudinally of the tractor, a lever arm rigidly fixed to one of said links, power operated means connected to said lever arm for swinging said one link vertically about its pivot point, a material handling device pivoted to said links to join the free ends thereof, swinging movement of said one link elevating said material handling device from a lowered position at which said links are substantially parallel to a raised position at which said links are substantially aligned in a vertical plane, and said material handling device substantially overlies said spaced pivot points within the tractor wheelbase, a first stop element on one of said links, and a second stop element on said material handling device cooperating with said first element when said material handling device is in a raised position to prevent over-centering of said links.

CLARENCE B. RICHEY.

References Cited in the file of this patent

UNITED STATES PATENTS

| Number | Name | Date |
|---|---|---|
| 2,311,671 | Larsen | Feb. 23, 1943 |
| 2,367,150 | Spaeth | Jan. 9, 1945 |
| 2,412,570 | Ender | Dec. 17, 1946 |
| 2,490,155 | Pfau et al. | Dec. 6, 1949 |
| 2,494,684 | Best | Jan. 17, 1950 |
| 2,534,886 | Stueland | Dec. 19, 1950 |